May 7, 1963  J. B. HOLSCHLAG ETAL  3,088,268
VIBRATION DAMPENING SUPPORT FOR SPINDLE
Filed July 25, 1960
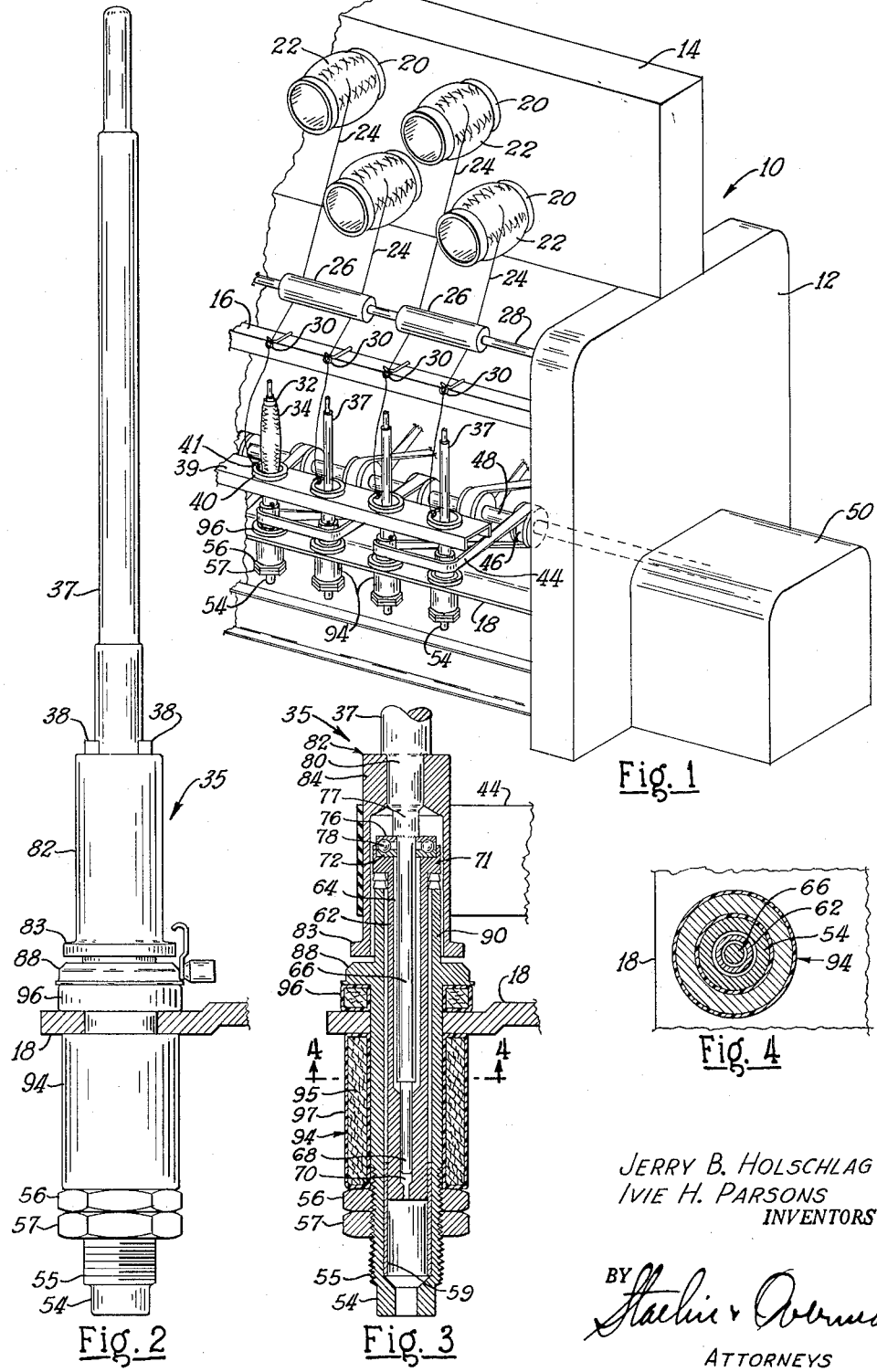
JERRY B. HOLSCHLAG &
IVIE H. PARSONS
INVENTORS
BY
ATTORNEYS ns, Aiken, S.C., assignors to Owens-Corning Fiberglas Corporation, a corporation of Delaware
Filed July 25, 1960, Ser. No. 45,133
9 Claims. (Cl. 57—135)

United States Patent Office 3,088,268
Patented May 7, 1963

3,088,268
VIBRATION DAMPENING SUPPORT FOR SPINDLE
Jerry B. Holschlag, Cumberland, R.I., and Ivie H. Parsons, Aiken, S.C., assignors to Owens-Corning Fiberglas Corporation, a corporation of Delaware
Filed July 25, 1960, Ser. No. 45,133
9 Claims. (Cl. 57—135)

This invention relates to supports for rotatable spindles and more especially to a support arrangement or bolster for high speed spindles of the character employed in processing or packaging textile strands or yarns.

It has been a practice in the textile field to employ spindles for twisting and plying yarns or strands which are driven at high speeds by driving belts from a common drive and the rotatable spindles mounted in a bolster or tubular supporting means which is usually provided with a coil spring for reducing vibration of the spindles. It is found that the "whipping" of the driving belts tends to set up vibrations which in some instances are not appreciably dampened by springs, and the potential energy in the springs may accentuate or increase the amplitude of vibration of the spindles. The spindle and a bobbin combination may not be in dynamic balance or a slightly random out-of-balance conditon in the package may occur tending to set up appreciable vibration of the spindle which is not absorbed by the spring.

A spring employed with a spindle functions as an energy storage medium and there is a tendency for the spring to retransmit the stored energy to the spindle and thereby accentuate the vibration of the spindle.

This invention embraces an arrangement or medium for use with a rotatable spindle especially for processing, twisting or packaging textile strands and yarns which provides for a more complete absorption of vibration energy to eliminate or greatly reduce spindle vibration particularly at high speeds.

An object of the invention resides in the provision of a force damping medium embodied in or associated with a bolster or support for a high speed rotatable spindle which is arranged to absorb or dampen vibratory movements of the spindle whereby the life of the bearings supporting the spindle is greatly increased and the noise level of high speed rotating spindles reduced to a minimum.

Another object of the invention resides in a vibration damping means associated with the support or bolster of a high speed rotatable spindle whereby there obtains a more complete absorption of vibration energy enabling the spindle to rotate with a minimum of wobble thereby improving the quality of the yarn twisted or plied as it is collected on a bobbin carried by the spindle.

Another object of the invention resides in the provision of a vibration dampener associated with a high speed rotatable spindle especially adapted for twisting or plying filamentary strands or yarns formed of glass fibers or filaments, the arrangement reducing vibration or wobble of the spindle to a minimum and thus correspondingly reducing variations in the pressure load whereby to minimize the liability of breakage of the strands or yarns.

Another object of the invention resides in a high speed spindle and mounting construction particularly adaptable for textile packaging embodying a vibration damping medium comprising a dense body of fibers in a resin envelope functioning as a vibration energy absorbent to eliminate or greatly minimize vibration set up by unbalance in the tube or package of filamentary material being collected or by eccentricity of the bobbin or deformation of a bobbin resulting from heat treatments.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an isometric view of a portion of a textile strand or yarn twisting or packaging apparatus embodying spindle supports embodying the invention;

FIGURE 2 is an elevational view of a spindle bolster embodying a form of vibration damping medium of the invention;

FIGURE 3 is a vertical sectional view through the spindle support and vibration damping medium of the invention, and FIGURE 4 is a transverse sectional view taken substantially on the line 4—4 of FIGURE 3.

While the invention has particular utility with high speed spindles for supporting bobbins of a twister apparatus for twisting or plying strands or yarns, it is to be understood that the spindle and vibration damping support may be employed with other types of spindles for packaging or processing textile or filamentary materials or wherever the same may be found to have utility.

Referring to the drawings in detail and initially to FIGURE 1, there is illustrated a twister or twisting apparatus 10 for processing or packaging strands or yarns and comprises a frame including end plates 12, one of which is shown in FIGURE 1, joined together by a creel arrangement 14, a guide supporting bar 16, a spindle rail 18 and other frame members (not shown) joined with the end plates 12.

The arrangement illustrated in FIGURE 1 is especially adapted for twisting or plying of filamentary materials formed of glass fibers or filaments and the creel 14 is provided with means adapted to support a plurality of packages of glass fibers or filaments which have been previously collected upon cylindrically-shaped tubes or sleeves 20 upon which strands of the fibrous material are wound as the fibers or filaments are formed.

The textile strands 24 are fed into contact with rolls 26, mounted upon a shaft 28 extending lengthwise of the frame, and through the lappet guides 30 to be wound on bobbins 32 (one being shown in FIGURE 1) which are telescoped over the blade or spindle 37 of a spindle construction 35 in winding the twisted strand into a package 34. Each of the spindle constructions 35 is supported upon a horizontal portion of the bolster or spindle rail 18. The spindles or blades 37 of the spindle constructions 35 extend upwardly through openings in a ring rail 39 which is preferably of channel shape in cross-section.

Arranged adjacent each opening in the ring rail 39 accommodating a spindle is a twisting ring 40, shown in FIGURE 1, each ring being equipped with a a traveller 41 of conventional character. As shown in FIGURE 1, the spindles 37 of each pair are rotated by a belt 44, each belt being driven by pulley 46 supported upon a drive shaft 48, the drive shaft being driven by a motor contained within a housing 50 disposed adjacent one of the frame end plates 12.

It is to be understood that the filamentary or textile materials from the packages 22 on the sleeves 20 are wound on bobbins carried on the blades or spindle portions 37 for building packages of twisted strand or yarn, there being relative vertical movement between the bobbins and the ring rail 39 necessary to perform the operation of building the yarn packages. The base of each spindle blade 37 is provided with lugs or keys 38 which engage in recesses in a bobbin for establishing a drive connection for the bobbin.

It is to be understood that the relative motion between the spindles and the ring rail may be effected either by raising and lowering the ring rail in relation to the spindle support rail 18, or by raising and lowering the spindle support rail in relation to the ring rail or by combined movements of the spindle support and ring rails. It is preferable, however, to vertically reciprocate the ring rail with respect to the spindles.

With particular reference to FIGURES 2 and 3, each spindle and support construction 35 is inclusive of a bolster or tubular member 54 having a threaded portion 55 accommodating securing nuts 56 and 57. The bolster 54 of each spindle construction extends through an opening in the bolster or support rail 18 and the nuts 56 and 57 manipulated to secure the bolster to the bolster rail. Positioned within the lower region of the hollow interior of the bolster 54 is a guide sleeve or bushing 59. A tubular member 62 extends into the hollow interior of the bolster 54 and within the bushing or sleeve 59.

Extending within the hollow interior 64 of member 62 is a shank portion 66 of a rotatable blade or spindle 37. The lower end of the shank portion 66 terminates in a tenon 68 which is snugly, yet rotatably, received in a bore 70 formed in the lower end region of the tubular member 62. The spindle or blade 37 is mounted in antifriction bearings.

As shown in FIGURE 3, a stationary ball race 72 is supported by an enlarged head or flange 71 formed integral with the tubular member 62. The upper bearing race 76 is secured on the shank portion 66 and abuts a shoulder formed by an enlarged portion 77 formed on the spindle 37. Bearing balls 78 are arranged between the races 72 and 76.

Mounted upon a portion 80 of the spindle 37 is a wharve or pulley 82 which accommodates the driving belt 44. A lower end of each wharve is formed with circular belt-guiding flange 83. The portion 84 of each wharve is pressed onto a cylindrical portion 80 of a spindle, the wharve being hollow to accommodate the anti-friction bearing for the spindle. The bolster 54 is provided with a circular flange 88 and extending upwardly from the flange 88 is a sleeve portion 90 projecting into the hollow interior or chamber formed within the wharve 82.

The bolster is equipped with a vibration damping medium of the invention which is effective to reduce vibration of the spindle in that it absorbs forces tending to cause vibration of the spindle or blade 37, the latter being adapted to rotate at high speeds of several thousand revolutions per minute. Surrounding the cylindrical portion of the bolster 54 beneath the bolster rail 18 is a vibration damping collar, sleeve or unit 94.

Arranged between the rail 18 and the lower surface of the flange 88 is a washer 96. In the embodiment illustrated the core of the vibration damping medium or collar 94 is fashioned of a dense mass of mineral fibers 95 such as glass fibers.

More specifically, the vibration dampening member or unit comprises a mass of glass fibers 95 compressed to a comparatively high density of about 20 lbs. per cubic foot. The dense fibrous core 95 is bonded or coated with comparatively thick jacket or envelope 97 of neoprene (chloroprene rubber) or the fibrous unit may be enveloped in or coated with other suitable nonmetallic material.

The resin-coated high dense fibrous unit provides a medium having high isolation efficiency, high vibration damping characteristics and is an effective noise barrier. The washer 96 may be of the same construction as the vibration damping unit 94 as illustrated in FIGURE 3, or the washer 96 may be fashioned of fiber and preferably of nonmetallic material.

In mounting the spindle and bolster unit upon the bolster rail 18, the threaded portion of the bolster 54 equipped with the washer 96 is snugly received in an opening formed in the bolster rail, the unit or collar 94 fitted into the shank of the bolster, the nut 56, providing an abutment means for the unit or collar 94, applied to an extent placing the vibration damping unit 94 under slight compression and the lock nut 57 drawn up to secure the unit 94 and bolster 54 in assembled relation with the rail 18.

The vibration damping unit 94 absorbs vibration effectively and, as the dense fibrous unit has no appreciable energy storing capacity, it does not transmit energy to the rotating spindle. By reason of its high isolation characteristics, it reduces the noise level of the high speed rotating spindle.

Furthermore, it tends to damp out reactions set up by any random unbalance condition in the bobbin or strand package so that the spindle runs more true with less tendency to wobble, a factor which improves the quality of the strand or yarn twisted or plied on the bobbins carried by the spindles. The dense fibrous constituent or component of the vibration damping unit formed of mineral or glass fibers is highly resistant to pressure and vibration loading fostering smooth substantially vibrationless spindle and bobbin operation.

It is apparent that, within the scope of the invention, modifications and different arrangements may be made other than as herein disclosed, and the present disclosure is illustrative merely, the invention comprehending all variations thereof.

We claim:

1. A twister including, in combination, a support rail, a rotatable spindle arranged to carry a bobbin, a bolster for the spindle mounted by the support rail, abutment means provided on the bolster, a vibration damping unit disposed between the abutment means and the support rail, said unit comprising a tubular core of a comparatively dense mass of compressed mineral fibers, and an envelope of resinous material embracing the core of mineral fibers.

2. In combination, a support, a rotatable spindle, a bolster for the spindle mounted by the support, a vibration damping unit associated with the support and the bolster, said unit having a core comprising a comparatively dense tubular mass of compressed mineral fibers, an envelope of nonmetallic material bonded to the tubular core of fibers, and means cooperable with the bolster for maintaining the vibration unit under compression.

3. A spindle and bolster assembly arranged to be mounted on a support rail of textile packaging apparatus including, in combination, a rotatable spindle, a bolster member, bearing means supporting the spindle for rotation relative to the bolster member, a wharve associated with the spindle arranged to be engaged by a driving means for rotating the spindle, said bolster member being provided with a flange, a washer disposed between the flange and the support rail, a cylindrically-shaped vibration damping unit surrounding a portion of the bolster member and engaging the support rail, said vibration damping unit comprising a tubular core of a comparatively dense mass of compressed fibers, a resin coating enveloping the core of fibers, and means engageable with the bolster member for securing the bolster member in assembled relation with the support rail and maintaining the vibration damping unit in a state of compression.

4. A vibration damping unit for a rotatable spindle including, in combination, a cylindrically-shaped tubular core comprising a comparatively dense mass of compressed glass fibers, and an envelope of resinous material embracing the core of glass fibers.

5. A twister including, in combination, a support rail, a rotatable spindle, a bolster for the spindle, said bolster provided with a shank extending through an opening in the support rail, a vibration damping means surrounding the shank and engaging the support rail, said vibration damping means comprising a tubular mass of compressed mineral fibers, and a coating of resinous material embracing the mass of compressed fibers.

6. A spindle and bolster assembly arranged to be mounted on a support rail of textile packaging apparatus including, in combination, a rotatable spindle, a bolster member, bearing means mounted by the bolster member and supporting the spindle for rotation relative to the bolster member, a wharve associated with the spindle arranged to be engaged by a driving means for rotating the spindle, a cylindrically-shaped vibration damping unit surrounding a portion of the bolster member and engaging the support rail, said vibration damping unit comprising a mass of glass fibers compressed to a density of about twenty pounds per cubic foot, a resin envelope embracing the mass of compressed fibers, abutment means surrounding the bolster member and engagable with the vibration damping unit, said abutment means being adjustable relative to the bolster member for maintaining the vibration damping unit in a state of compression.

7. A twister including, in combination, a support rail, a rotatable spindle arranged to carry a bobbin, a bolster for the spindle mounted by the support rail, an abutment means carried by the bolster, a vibration damping unit disposed between the abutment means and the support rail, said unit comprising a tubular mass of compressed mineral fibers, and an envelope of nonmetallic material bonding the mass of fibers in tubular configuration.

8. In combination, a support rail, a rotatable spindle, a bolster for the spindle, bearing means mounted by the bolster supporting the spindle for rotation relative to the bolster, a portion on said bolster extending through an opening in the support rail, a vibration damping medium surrounding a portion of the bolster and engaging the rail, said vibration damping medium comprising a tubular core formed of a dense mass of compresssed mineral fibers, an envelope of nonmetallic material bonding fibers of the tubular core, and means associated with the bolster for retaining said bolster and vibration damping medium in assembled relation.

9. A vibration damping unit for a rotatable spindle including, in combination, a tubular core comprising a comparatively dense mass of compressed mineral fibers, and an envelope of resinous material embracing the core of mineral fibers.

References Cited in the file of this patent
UNITED STATES PATENTS

| | | |
|---|---|---|
| 2,148,104 | Burke | Feb. 21, 1939 |
| 2,600,843 | Bush | June 17, 1952 |
| 2,766,163 | Schwartz et al. | Oct. 9, 1956 |
| 2,857,189 | Jeffery | Oct. 21, 1958 |

FOREIGN PATENTS

| | | |
|---|---|---|
| 1,027,572 | Germany | Apr. 3, 1958 |
| 565,438 | Italy | July 20, 1957 |